April 20, 1937.  G. W. ROOSA  2,078,023
VEHICLE HEADLIGHT
Filed April 2, 1934
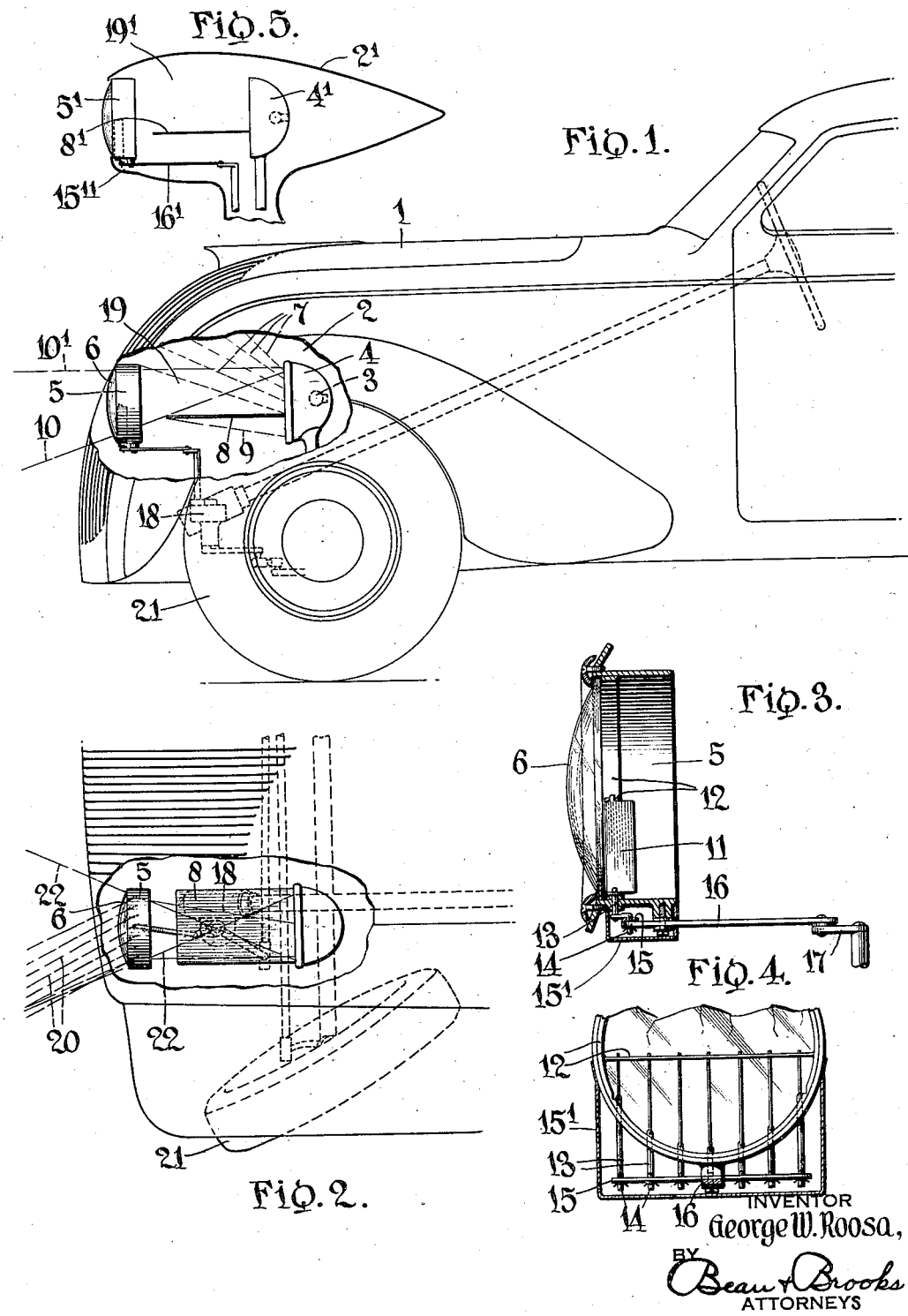
INVENTOR
George W. Roosa,
BY
Bean & Brooks.
ATTORNEYS Patented Apr. 20, 1937

2,078,023

UNITED STATES PATENT OFFICE 2,078,023

VEHICLE HEADLIGHT

George W. Roosa, Kenmore, N. Y.

Application April 2, 1934, Serial No. 718,715

5 Claims. (Cl. 240—7.1)

This invention relates to a motor vehicle headlight construction and it aims to improve the highway illumination without the offensive and annoying glare incidental to the present day headlight.

With the headlight now in use considerable glare and uncontrolled light rays emanate and cause much discomforture and blinding annoyance to persons approaching the vehicle. Attempts have been made to control the light rays through prismatic arrangements and other means but they appear to have proved inefficient in preventing glare and confining the forwardly projected light beam to a properly restricted form and area.

The present invention has for its object to provide a headlight which is practical and efficient, and further to control the projected light beam whereby an efficient maximum lighting of the highway for night driving is obtained and the dazzling and blinding effect on approaching motorists is practically eliminated.

In the drawing:

Fig. 1 is a fragmentary showing of a headlight embodying the present invention built into the motor vehicle body, portions of the vehicle being broken away to more clearly depict the headlight arrangement.

Fig. 2 is a fragmentary plan view of the vehicle with portions broken away to further illustrate the embodied headlight construction.

Figs. 3 and 4 are detailed views of the light beam emitting window or front of the headlight.

Fig. 5 is a sectional view of a modification in which the individual headlamp unit is depicted, rather than built in type.

Referring more in detail to the accompanying drawing, Figs. 1 and 2 illustrate in fragment a streamline automobile in which the forwardly extending body portion is provided with a hood structure enclosing a compartment 2 for the vehicle engine or power plant.

The headlight of the present invention includes a headlamp section and a light emitting window. The headlamp comprises an incandescent bulb 3 within a parabolic reflector 4 by which its light rays are directed forwardly. The headlamp is disposed rearwardly a distance from the light emitting window 5 to provide a space 19, the window being closed by a glass or lens body indicated at 6. The space 19 thus provided between the headlamp and the window 5 is unconfined and permits the escape and absorption of practically all of the laterally and upwardly directed light rays against reflection back and forth across the path of the horizontal light rays, such as would occur if a beam confining housing of practically the same diameter as the window 5 were utilized to enclose such space. Such upwardly directed light rays which pass out from the path of the horizontal light rays into the space are indicated by the broken lines 7.

In Fig. 5 the headlight housing or casing 2' is illustrated as being of the streamline design and may be mounted on the vehicle exteriorly of the engine hood and compartment. The inner walls of the housing are non-reflective, preferably black, so that the escaping laterally directed rays passing out through the space 19' between the lamp reflector 4' and the window 5' are absorbed and not reflected back across the main light beam.

In Figs. 1 and 2 the headlight is built into the engine hood or vehicle body structure so that the hood structure will constitute the headlight housing, the window being embedded in the front wall of the hood and the space 19 preferably opening into the engine compartment.

Those light rays which are reflected upwardly from the lower portion of the reflector 4 and which would ordinarily pass through the upper portion of the window are intercepted by one or more opaque light absorbing plates, there being here depicted only one such plate at 8 which is disposed in the space between the headlamp 4 and the window 5. Such plate may be mounted in a fixed position by adjustable brackets (not shown) and is disposed horizontally so as to obstruct practically only those rays which are reflected upwardly from the headlamp toward the window 5. The broken line 9 indicates the lowermost reflected ray passing from the reflector 4 in an upward direction and being obstructed in its upward passage by the forward end of the plate 8. It is desired not to extend this plate beyond this point since otherwise the downwardly reflected rays, indicated by the broken line 10 and which are free to pass through the lower portion of the window for illuminating the road immediately in front of the vehicle, would be blocked off.

Thus, the light rays passing out through the window 5 are limited primarily to horizontally directed rays 10' and the downwardly reflected rays 10. The upwardly directed rays 7 passing out through the space 19 (19') are not reflected back across the path of the main light beam, nor are those rays which are obstructed by the horizontal plate since the latter has its surface preferably non-reflecting and light absorbing. Furthermore, by having the headlamp separated from the window 5 by the unconfined space free access to the engine and motor vehicle parts is obtainable at all times by merely raising the hood or through the usual means of access. The plate 8 may readily be removed when this is necessary.

Means are provided for directing a part of the light beam to the side of the road, and since the light rays passing through the lower portion or segment of the window include the downwardly directed rays 10, it is preferred to deflect the lower segment rays laterally. This is accomplished in the present disclosure by reflector panels 11 mounted on vertical axes within a frame 12 and adjusted at the proper angle to obtain the desired deflection.

It is preferable to have these panels automatically adjustable with the steering of the vehicle so that when turning the vehicle to the right or left these panels will have their reflective surfaces accordingly adjusted for deflecting a portion of the projected light beam in the direction of the turn. To this end both surfaces of the panels may be reflective for both right and left turns while the panels are mounted on vertical pivots 13 having crank arm extensions 14 joined by a transverse bar 15 which in turn is connected by a lever 16 to an actuator part 17 on the steering mechanism the latter being generally indicated at 18. Consequently, when the front wheels of the vehicle are turned to the right or left the reflector panels will accordingly be adjusted to reflect the light rays in the direction in which the turn is being made.

Referring to Fig. 2, such deflected portion of the light beam is indicated by the broken lines 20 as being deflected to the left in harmony with the left turn position given to the front wheel 21, while the main light beam passing through the upper portion of the window maintains its true forward projection as indicated by the broken lines 22. Thus, the motorist not only has the light beam directed forwardly but also a portion of it deflected laterally in the direction of turn so that ample illumination of the roadway is provided both ahead and sidewise.

The cross sectional shape of the light emitting window 5 may be circular, as illustrated, or of any other desired shape. Because of the deflection of the light beam passing through the lower part of the window it may be desirable to broaden out such lower portion of the window for greater illumination. This may be accomplished by making the light window in the shape of a horizontal oval, rectangle, or the like, no specific showings of the various shapes being here made. The pivots 13 with their crank extensions 14 and connecting bar 15 may be enclosed in a dust-proof housing as indicated at 15' if desired.

What is claimed is:

1. A headlight construction for motor vehicles, having a window, a reflector rearwardly from the window, a source of light in the reflector, a light ray intercepting plate interposed between the reflector and the window in a plane substantially parallel to the axis of the forwardly projecting light beam, said plate being disposed substantially below the beam axis for intercepting light rays tending to pass upwardly through the window and terminating short of the window to permit substantially full passage of downwardly directed light rays through the window, and a plurality of vertically disposed laterally spaced slats disposed in the lower sector of the window and arranged for receiving the lower portion of such downwardly projecting light rays for reflecting them laterally with the lower portion of the forwardly projecting light beam, the upper portion of the window being free for unobstructed projection of the upper portion of the light beam.

2. A headlight construction having a window, a reflector behind the window, a source of light in the reflector, means for intercepting light rays tending to pass upwardly through the window while permitting passage of downwardly directed light rays through such window, and a plurality of vertically disposed and laterally spaced slats arranged in the lower sector of the window for receiving the lower portion of such downwardly directed light rays along with the lower portion of the forwardly projected light beam for reflecting them laterally while permitting the upper portion of the forwardly projected light beam free and unobstructed passage through the upper sector of the window.

3. A headlight construction having a window, a reflector behind the window, a source of light in the reflector, means for intercepting light rays tending to pass upwardly through the window while permitting passage of downwardly directed light rays through such window, a plurality of vertically disposed and laterally spaced slats arranged in the lower sector of the window for receiving the lower portion of such downwardly directed light rays along with the lower portion of the forwardly projected light beam for reflecting them laterally while permitting the upper portion of the forwardly projected light beam free and unobstructed passage through the upper sector of the window, and means for automatically adapting the slats for connection to the steering mechanism of a motor vehicle for automatically adjusting the slats substantially in positional agreement with the angle of turn of the vehicle, whereby the roadway, both forwardly and laterally of the vehicle, is illuminated.

4. A headlight construction for motor vehicles, having a window, a reflector rearwardly from the window, a source of light in the reflector, a light ray intercepting plate interposed between the reflector and the window in a plane substantially parallel to the axis of the forwardly projecting light beam, said plate being disposed substantially below the beam axis for intercepting light rays tending to pass upwardly through the window and terminating short of the window to permit substantially full passage of downwardly directed light rays through the window, a plurality of vertically disposed laterally spaced slats disposed in the lower sector of the window and arranged for receiving the lower portion of such downwardly projecting light rays for reflecting them laterally with the lower portion of the forwardly projecting light beam, the upper portion of the window being free for unobstructed projection of the upper portion of the light beam, and means for connecting the slats to the steering mechanism of the vehicle for automatically adjusting the slats substantially in positional accord with the turn of the vehicle, whereby the roadway, both forwardly as well as laterally of the vehicle, is illuminated.

5. A headlight construction for motor vehicles having an engine hood, a window in the front end of the hood, a reflector rearwardly spaced from the window and disposed beneath the hood whereby angular light rays may pass laterally through the intervening space beneath the hood for illuminating the same, a source of light in the reflector, a light ray intercepting plate interposed in the intervening space in a plane substantially parallel to the axis of the forwardly projecting light beam, said plate being disposed substantially below the beam axis for intercepting light rays tending to pass upwardly through the window and terminating short of the window to permit substantially full passage of downwardly directed light rays through the window, and a plurality of vertically disposed laterally spaced slats disposed in the lower sector of the window and arranged for receiving the lower portion of such downwardly projecting light rays for reflecting them laterally with the lower portion of the forwardly projecting light beam, the upper portion of the window being free for unobstructed projection of the upper portion of the light beam.

GEORGE W. ROOSA.